(12) United States Patent
Hahn et al.

(10) Patent No.: US 8,559,138 B1
(45) Date of Patent: Oct. 15, 2013

(54) DUAL STAGE ACTUATOR SUSPENSION HAVING A SINGLE MICROACTUATOR AND EMPLOYING PSEUDO SYMMETRY TO ACHIEVE SUSPENSION BALANCE

(75) Inventors: Peter Hahn, Wildomar, CA (US); Wei Keat Chai, Temecula, CA (US); Kuen Chee Ee, Murietta, CA (US)

(73) Assignee: Magnecomp Corporation, Murrieta, CA (US)

( * ) Notice: Subject to any disclaimer, the term of this patent is extended or adjusted under 35 U.S.C. 154(b) by 0 days.

(21) Appl. No.: 13/530,522

(22) Filed: Jun. 22, 2012

Related U.S. Application Data

(63) Continuation of application No. 12/705,980, filed on Feb. 16, 2010, now Pat. No. 8,228,642.

(60) Provisional application No. 61/152,865, filed on Feb. 16, 2009.

(51) Int. Cl.
*G11B 21/24* (2006.01)
*G11B 5/596* (2006.01)

(52) U.S. Cl.
USPC .................................. 360/294.4; 360/244.5

(58) Field of Classification Search
USPC .......................................... 360/294.4, 244.5
See application file for complete search history.

(56) References Cited

U.S. PATENT DOCUMENTS

| | | |
|---|---|---|
| 4,814,908 A | 3/1989 | Schmitz |
| 5,189,578 A | 2/1993 | Mori et al. |
| 5,440,437 A | 8/1995 | Sanada et al. |
| 5,959,808 A | 9/1999 | Fan et al. |
| 5,995,334 A | 11/1999 | Fan et al. |
| 6,002,549 A | 12/1999 | Berman et al. |
| 6,268,983 B1 | 7/2001 | Imada et al. |
| 6,298,545 B1 | 10/2001 | Mohajerani et al. |
| 6,381,104 B1 | 4/2002 | Soeno et al. |
| 6,473,274 B1 | 10/2002 | Maimone et al. |
| 6,541,931 B2 | 4/2003 | Ho et al. |
| 6,614,627 B1 | 9/2003 | Shimizu et al. |
| 6,731,472 B2 | 5/2004 | Okamoto et al. |
| 6,851,120 B2 | 2/2005 | Crane et al. |
| 6,903,486 B2 | 6/2005 | Jerman et al. |
| 7,038,888 B2 | 5/2006 | Ma |
| 7,382,583 B2 | 6/2008 | Hirano et al. |
| 7,872,834 B1 | 1/2011 | Pokornowski et al. |
| 8,144,435 B2 | 3/2012 | Greminger et al. |
| 8,228,642 B1 * | 7/2012 | Hahn et al. ............... 360/294.4 |
| 2006/0279880 A1 * | 12/2006 | Boutaghou et al. ........ 360/294.4 |
| 2007/0291418 A1 | 12/2007 | Kwon et al. |
| 2009/0027807 A1 | 1/2009 | Yao et al. |
| 2009/0244786 A1 | 10/2009 | Hatch |

\* cited by examiner

*Primary Examiner* — Craig A. Renner

(74) *Attorney, Agent, or Firm* — Intellectual Property Law Offices of Joel Voelzke, APC

(57) ABSTRACT

A dual stage actuator (DSA) suspension has a single microactuator such as a PZT element on one side of central longitudinal axis of the suspension, and a pseudo symmetry structure formed or affixed on the other side of the central longitudinal axis opposite the PZT. The pseudo symmetry structure has mass and stiffness that mirrors the PZT, thus keeping the suspension mechanically balanced and symmetric about the longitudinal axis for improved suspension performance especially in a shock environment.

11 Claims, 3 Drawing Sheets

DUAL STAGE ACTUATOR SUSPENSION HAVING A SINGLE MICROACTUATOR AND EMPLOYING PSEUDO SYMMETRY TO ACHIEVE SUSPENSION BALANCE

CROSS-REFERENCE TO RELATED APPLICATIONS

This application is a CONT of U.S. application Ser. No. 12/705,980 filed Feb. 16, 2010, which claims priority from U.S. Provisional Patent Application Ser. No. 61/152,865 filed Feb. 16, 2009, the disclosures of which are incorporated by reference herein as if set forth in their entireties.

BACKGROUND OF THE INVENTION

1. Field of the Invention

This invention relates to the field of hard disk drive suspensions having dual stage actuators. More particularly, this invention relates to the field of a dual stage actuator suspension for a hard disk drive, the suspension having a single microactuator device and employing pseudo symmetry to balance the suspension.

2. Description of Related Art

In a hard disk drive, the suspension is the component that holds the read-write head over the desired data track on the spinning magnetic hard drive. The disk drive could also be an optical disk or possibly other data storage technologies. As track densities increase and drives are made smaller, there is a constant need in the industry for greater precision in the disk drive components including the actuator(s) that move the read-write head to the correct data track.

Suspensions have been proposed that have dual stage actuators (DSAs), with the first stage being the voice coil motor that traditionally has moved the suspension, and the second stage being a microactuator mounted on the suspension itself that makes extremely fine adjustments to the head position. The microactuator typically comprises a pair of piezoelectric devices such as lead zirconate titanate (PZT) devices mounted in a push-pull configuration, such that one PZT pulls one side of the suspension while the other PZT pushes the other side. For purposes of the present disclosure and for purposes of simplicity of discussion, the microactuator will generally be referred to as a PZT although it will be understood that microactuators other than PZTs can be used. Representative of a dual PZT type DSA suspension are U.S. Pat. No. 6,614,627 issued to Shimizu et al, and U.S. Pat. No. 6,731,472 issued to Okamoto et al, which describe DSA suspensions using PZT devices as the microactuators. Those patents employ two non-split PZTs. A non-split PZT, also called a single pole PZT, is a PZT which has only a single electrical pole per face. FIG. 1 is a representative illustration of a DSA type suspension having two single-pole PZT's 8 and 9 according to the prior art.

Another known design uses a split PZT. A split PZT is a single device in which the device is split into two portions that can be driven separately, such that a single device is capable of both expanding on one side and contracting on the other side. Split PZT's are typically formed by metalizing both the top face and the bottom face of the device, with a split line in the middle created by photo patterning. A split PZT behaves as if it is two separate PZTs. Split PZTs typically have three electrical connections: a right side driving voltage connection, a left side driving voltage connection, and a common ground connection.

Other configurations of PZT microactuated suspensions have been proposed. U.S. Pat. No. 6,381,104 issued to Soeno et al. shows a piezoelectric moving-slider microactuator that moves the slider by rotation. U.S. Pat. No. 7,382,583 issued to Hirano et al. describes a DSA suspension that uses a rotary piezoelectric microactuator.

DSA suspensions that use a microactuator other than a PZT microactuator have also been proposed. U.S. Pat. Nos. 5,959,808 issued to Fan et al. and 5,995,334 issued to Fan et al. describe electrostatic microactuators for suspensions.

DSA suspensions have also been proposed using PZTs in various locations, including on the mount plate, on the load beam, or on the gimbal tongue close to the slider.

Due to the additional cost of DSA suspensions over traditional suspensions, it is believed that DSA suspensions have only been recently become available commercially. There is therefore a need for reducing manufacturing costs of DSA suspensions.

SUMMARY OF THE INVENTION

The present invention is of a DSA type suspension requiring only a single non-split PZT microactuator, but which nevertheless is balanced about the central longitudinal axis of the suspension or load beam to within an acceptably high degree of mass balance and inertial balance. A mechanically balanced suspension will generally perform better, such as by not twisting in response to vertical movements of the suspension as the disk surface flutters or as the drive is bumped.

To achieve the balancing, an element which will be called herein a pseudo symmetry structure or element, or balancing structure or element, is either mounted to or fabricated on the suspension in a location generally opposite the microactuator. The pseudo symmetry element is designed such that it has a mass, a stiffness, and preferably a mass distribution that generally correspond to the microactuator, thus making the suspension generally symmetric about the longitudinal axis as measured by mass, stiffness, inertial distribution, and other relevant parameters.

A DSA suspension according to the present invention therefore typically has a central longitudinal axis, a PZT microactuator mounted on a first side of the central longitudinal axis for making fine radial adjustments in the position of a read-write head at or near the distal end of the suspension, and a pseudo symmetry structure on a second and opposite side of the central longitudinal axis, the pseudo symmetry structure mimicking the mechanical properties of the PZT and being generally disposed in mirror relation thereto. The pseudo symmetric structure is created such that it has similar mass and stiffness, and preferably similar mass distribution, as that of the PZT, in order to keep the suspension inertially symmetric about the central longitudinal axis.

In a first embodiment, the pseudo symmetry structure comprises a stainless steel pseudo symmetry element that is welded or otherwise affixed to the suspension on a first side of a central longitudinal axis of the suspension generally opposite the PZT mounted on the second side of the central longitudinal axis. The pseudo symmetry element is generally symmetrical about both its x and y horizontal axes, and has a central hole therethrough in order to give the pseudo symmetry structure a spring-like stiffness that generally matches the spring-like stiffness of the PZT.

By requiring only a single non-split PZT instead of either two non-split PZTs or a single split PZT as in previous designs, the present invention allows for simpler and therefore lower cost DSA suspensions that nevertheless are acceptably symmetrical about the longitudinal axis. This is true regardless of whether the microactuator is located on the mount plate, on the beam portion, on the gimbal tongue, or anywhere else on the suspension.

Exemplary embodiments of the invention will be further described below with reference to the drawings, in which like numbers refer to like parts.

DETAILED DESCRIPTION OF THE PREFERRED EMBODIMENTS

Figure 1:
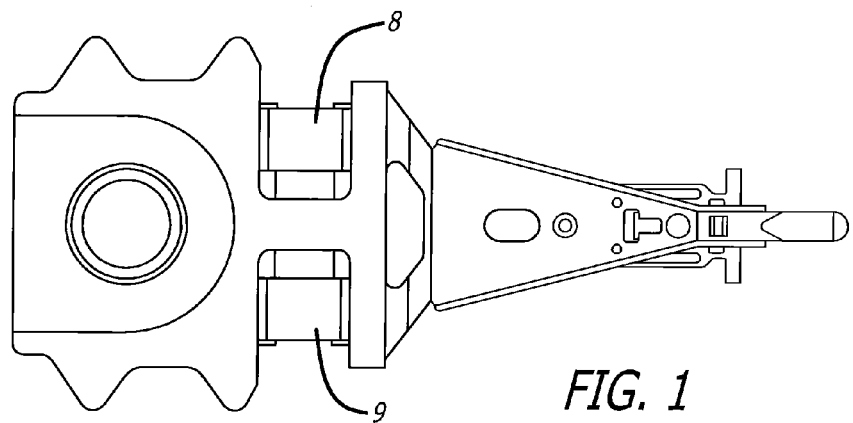
FIG. 1 is a top plan view of a prior art DSA suspension employing two non-split PZTs.
Figure 2:
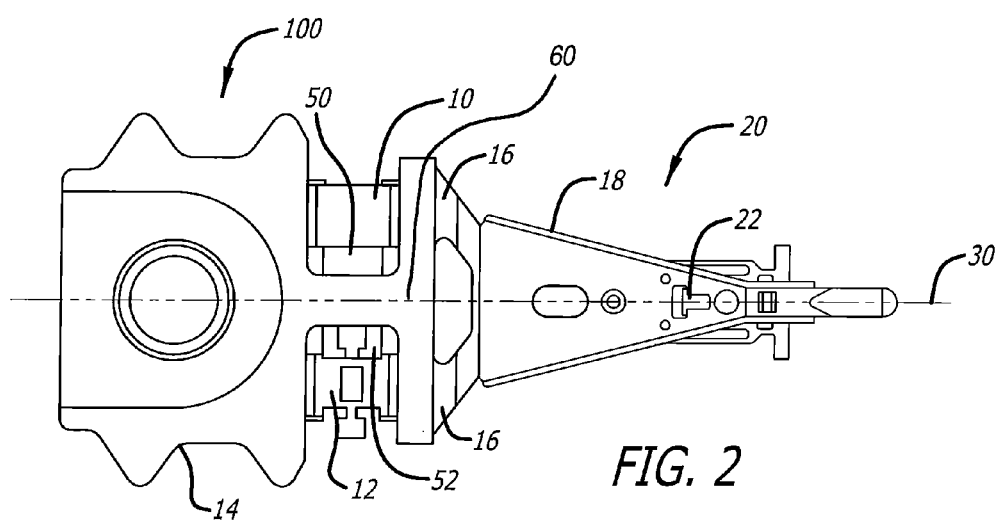
FIG. 2 is a top plan view of a DSA suspension according to a first embodiment of the present invention.

FIG. 2 is a top plan view of a DSA suspension 100 having PZT 10 and balancing structure or pseudo symmetry structure 12 according to a first embodiment of the present invention. PZT 10 has convention electrical connections thereto (not shown) that will add somewhat to the weight and inertial characteristics of PZT 10. For purposes of the present discussion throughout this disclosure and the appended claims, what will be referred to as the PZT or other microactuator encompasses the electrical connections thereto and their weights. Pseudo symmetry structure 12 may be fabricated separately and thereafter affixed to suspension 100 such as by an adhesive such as epoxy, or by laser welding. It is currently anticipated that the preferred embodiment will include at least one added stainless steel component that is formed separately and later affixed to the suspension by welding. Accordingly, in the discussion that follows, although the pseudo symmetry structure component will be referred to for brevity as being welded to the suspension, it will be understood that the component could be affixed to suspension 100 by any other suitable means. PZT 10 and pseudo symmetry structure 12 are located on opposite sides of central longitudinal axis 30 of suspension 100, in generally mirror relation. That is, PZT 10 and pseudo symmetry structure 12 lie on opposite lateral sides of suspension 100. In the embodiment, suspension 100 has two gaps 50 and 52 formed therein on either lateral side of a central pivot 60 about which load beam 18 pivots when PZT 10 is activated, with the voids being generally of the same size and shape and disposed in mirror relation about central longitudinal axis 30. PZT 10 spans first void 50, and pseudo symmetry structure 12 spans second gap 52, also in generally mirror relation about central longitudinal axis 30, with pseudo symmetry structure 12 welded across gap 52. Central pivot 60 is disposed on central longitudinal axis 30.

Alternatively, instead of being welded to suspension 100, pseudo symmetry structure 12 may be integrally formed with suspension 100 by etching, stamping, laser cutting, or otherwise working suspension 100, or by a combination of working the suspension and adding material. Pseudo symmetry structure 12 can be either thicker, thinner, or the same thickness as, the surrounding stainless steel, due to the ability to selectively etch away stainless steel material from either the area of the stainless steel sheet that will become pseudo symmetry structure 12 and/or from the area that will become the mount plate, the load beam, or other structure with which pseudo symmetry structure 12 will be integrally formed.

PZT 10 and pseudo symmetry structure 12 can be located on a tip of mount plate 14, also referred to as the base plate, near and proximal to suspension springs 16 as shown in FIG. 2, or could be located on beam portion 18 of load beam 20, or on gimbal tongue 22, or in any other suitable location as will be apparent to those skilled in the relevant art.

Pseudo symmetry structure 12 preferably matches the PZT 10 to within 40%, and more preferably to within 20%, and more preferably still to within 10%, and more preferably still to within 5%, in each of the parameters of mass, stiffness, inertial distribution, and any other relevant parameters, with the result that the overall suspension is mass and inertially balanced about the central longitudinal axis to within at least 10%, and preferably to within 5%, and more preferably still to within 2%.

Figure 3:
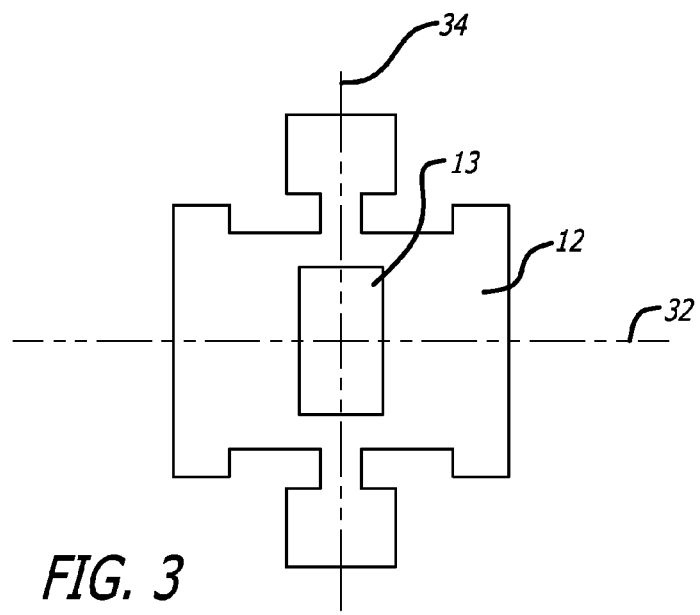
FIG. 3 is a top plan view of pseudo symmetry element 12 of the suspension of FIG. 2.

FIG. 3 is a top plan view of pseudo symmetry structure 12 of suspension 100 of FIG. 2. Pseudo symmetry structure 12 has a central hole 13 and is symmetric about two horizontal axes 32 and 34. If pseudo symmetry structure 12 is formed integrally with the stainless steel suspension 100 by etching, stamping, or other forming operation that is otherwise part of the load beam manufacturing process, then no additional parts will be required to be formed and affixed to the suspension 100, resulting in substantial manufacturing cost reduction. Alternatively, pseudo symmetry structure 12 could be formed separately of different materials or combinations of materials and thereafter affixed to suspension 100 such as by laser welding, adhesive, or by other known methods. Regardless of whether pseudo symmetry structure 12 is integrally formed with suspension 100 or is separately formed and thereafter affixed thereto, pseudo symmetry structure 12 will not require an electrical circuit trace to be routed thereto and electrically connected thereto, thus eliminating the cost associated with routing and connecting electrical circuits to a second PZT, or to the second half of a split PZT, as in prior art designs. Even if PZT 10 is a split PZT, simplicity and cost savings are still realized because the electrical traces needed to drive the two halves of the PZT are routed and connected to only one side of suspension 10 while still maintaining pseudo symmetry and balance of suspension 100.

Figure 4A:
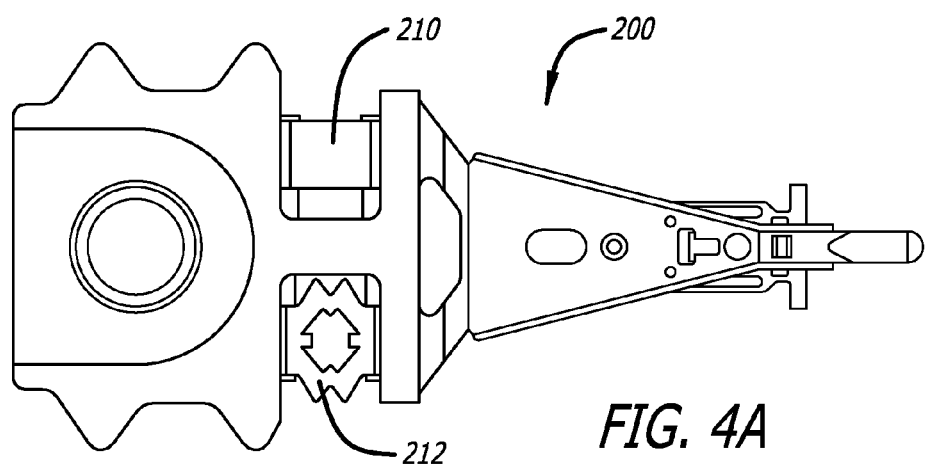
FIG. 4A is a top plan view of a DSA suspension having a single non-split PZT and a pseudo symmetry structure according to a second embodiment of the invention.

FIG. 4A is a top plan view of a DSA suspension 200 having a single non-split PZT 210 and a pseudo symmetry structure 212 according to a second embodiment of the invention. This embodiment is similar to the embodiment of FIG. 2 except that the shape of pseudo symmetry structure 212 is different.

Figure 4B:
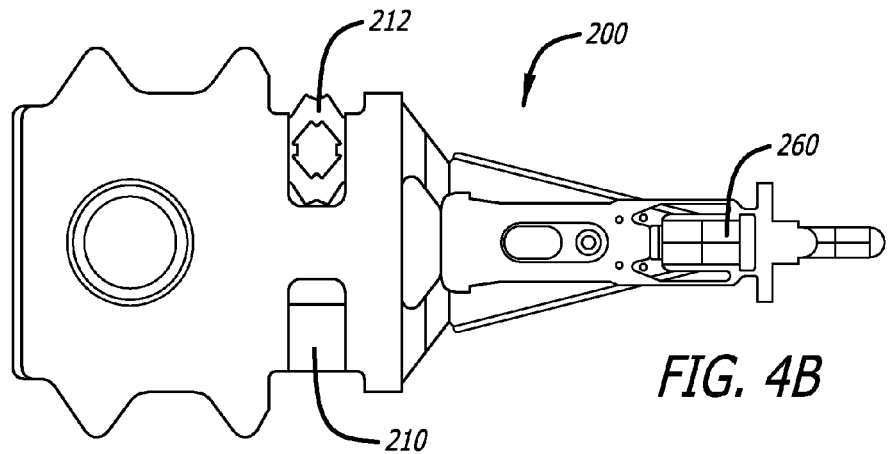
FIG. 4B is a bottom plan view of the suspension of FIG. 4A.

FIG. 4B is a bottom plan view of the suspension of FIG. 4A. This view shows magnetic head slider 260 which is a conventional head slider. In operation, PZT microactuator 210 expands or contracts in response to a microactuator driving voltage applied thereto causing the distal end of suspension 200 carrying head slider 260 to move slightly up or down as oriented in the figure, thus effecting microfine movements of head slider 260 in order to keep head slider 260 properly positioned over the desired data track on the magnetic disk surface (not shown). Pseudo symmetry element 212 counterbalances PZT both statically and inertially.

Figure 5:
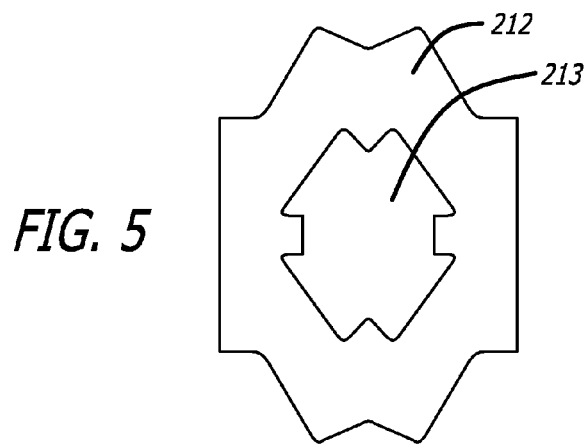
FIG. 5 is a top plan view of the pseudo symmetry component of the suspension of FIG. 4A.

FIG. 5 is a top plan view of the pseudo symmetry structure 212 of the suspension of FIG. 4A.

In the embodiments of FIGS. 2-5 and with particular reference to FIG. 5, the balancing structures have a generally ring shape having a central hole 213 or other aperture formed therein. By adjusting the size and shape of central hole 213, the ring inner and outer diameters, the shape and contours of the ring, the thickness of the ring, and the stiffness of the pseudo symmetry structure 212 in the x, y, and z directions, the pseudo symmetry structure 212 can be made to have mechanical properties that generally mirror the corresponding mechanical properties of PZT 210.

Pseudo symmetry structure 212 need not have a single central hole 213 therethrough, but could instead have a plurality of holes, slots, or other apertures formed therein, or adjacent portions of the suspension 100 could have one or a plurality of holes, slots, or apertures formed therein, so long as the overall balancing structure generally mirrors the characteristics of PZT 210. The pseudo symmetry structure 212 need not be flat, but could in general have any three dimensional shape. A three dimensional shape, similar to the shape of PZT 210 itself, could better simulate and thus mirror the inertial components of PZT 210 in the three linear directions and the three rotational directions.

The characteristics of pseudo symmetry structure 212 can be further modified, either over its entirety or locally, by other processing techniques as well. A first such possible technique is partial etching of pseudo symmetry structure 212 on either side or both sides to create depressions, mesas, ridges, valleys, or any other contoured features, similar to the triangular partial etch patterns visible in FIG. 6 in suspension 300 in its load beam near the suspension springs. The material of pseudo symmetry structure 212 could also be modified by localized laser irradiation. Still further, the material could be modified by heat treating, although heat treating is currently considered undesirable because the stainless steel foil used to make the suspensions is usually strain hardened, and heat treating would therefore undesirably anneal the steel. Other techniques to modify the characteristics of pseudo symmetry structure, either overall or locally, will be apparent to those skilled in the art of materials science and materials processing. All of those techniques can allow focused tailoring of stiffness and deflection in pseudo symmetry structure 212 in the x, y, and z axes. Laser irradiation and various other localized material processing techniques could also be used to locally tailor the characteristics of the stainless steel elsewhere on the suspension to assist in the overall balancing of the suspension.

Although PZT 210 will in most cases be the component of suspension 200 that contributes the most to non-symmetry of suspension 200, other components including but not limited to the electrical signal trace (not shown) could contribute to static and inertial asymmetry of suspension 200. Pseudo symmetry structure 212 could be designed to at least partially compensate for those other asymmetries as well thereby counterbalancing those other asymmetries.

Additionally, the balancing structure need not be a single pseudo symmetry element that by itself counterbalances PZT 210. Rather, the overall pseudo symmetry structure could be comprised of a tab, spring, and/or other structure(s) integrally formed with one or more components of suspension 100, combined with a spring element, weight, or other element, preferably of stainless steel welded to the suspension, such that the combined characteristics of the component(s) of the pseudo symmetry structure that are formed integrally with suspension 100 combined with the component(s) of the pseudo symmetry structure that are formed separately and later affixed to suspension 100 generally mirror and therefore counterbalance the characteristics of PZT 210 located on the other side of the central longitudinal axis of suspension 200. Such a more generally pseudo symmetry structure or balancing structure is shown in FIG. 6 which is described below.

Figure 6:
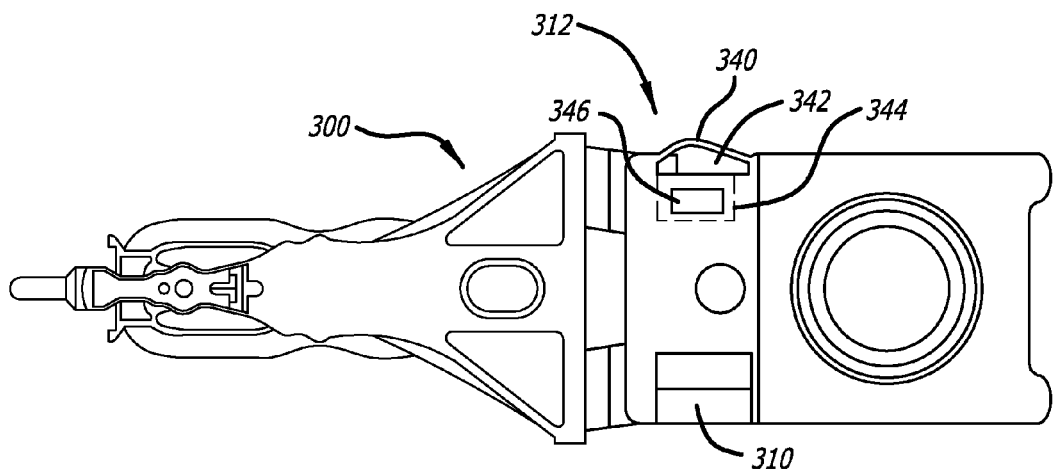
FIG. 6 is a top plan view of a suspension having a spring feature formed integrally in the suspension in order to balance the stiffness characteristics of the PZT microactuator, according to a further embodiment.

FIG. 6 is a top plan view of a suspension having a spring feature formed integrally in the suspension in order to balance the stiffness characteristics of the PZT microactuator, according to a further embodiment. In particular, suspension 300 has a pseudo symmetry structure 312 comprising several different components, specifically: aperture 342 formed in suspension 300; a spring 340 formed integrally with suspension 300; a portion 344 of the suspension which is not etched away and which therefore does not mirror the cavity across which PZT 310 extends, and an added weight 346 welded to suspension 300. Taken together, suspension portion 344, aperture 342, spring 340, and added weight 346 define pseudo symmetry structure 312 which counterbalances PZT 310. Preferably unremoved suspension portion 344, aperture 342, spring 340, and added weight 346 are all adjacent each other, and preferably all of those elements lie within a common area that is less than or equal to the size of the area occupied by PZT 310.

In all of the embodiments shown, the pseudo symmetry structures 12 and 212, and spring 340, are designed with the knowledge of how the stiffness of the PZT compares to the stiffness of the stainless steel used for the pseudo symmetry structures. For the embodiment shown in FIG. 6, typically, the stiffness of the PZT 310 will be about one third the stiffness of the stainless steel in spring 340, where the stainless steel in spring 340 has the same thickness as the thickness of the tip of the mount plate to which the suspension springs are attached.

The present invention can be used in combination with microactuators other than PZTs. Additionally, the present invention can be applied to suspensions regardless of where the microactuator is located on the suspension, including suspensions in which the microactuator is located on the mount plate, on the load beam, on the gimbal tongue, or any other location.

Although the present invention enables a DSA suspension to be constructed using a single, single-pole PZT, the invention is applicable and can be used in other contexts as well. For example, the invention could be employed with a single split-pole PZT, or even with multiple PZTs in a hard drive suspension or other product where it would be desirable to mimic a PZT microactuator or other component.

It will be understood that the terms "approximately," "about," "substantially," and "generally" as used within the specification and the claims herein allows for a certain amount of variation from any exact dimensions, measurements, arrangements, and characteristics, and that those terms should be understood within the context of the description and operation of the invention as disclosed herein.

It will further be understood that terms such as "top," "bottom," "above," "below," "horizontal," and "vertical" as used within the specification and the claims herein are terms of convenience that denote the spatial relationships of parts relative to each other rather than to any specific spatial or gravitational orientation. Thus, the terms are intended to encompass an assembly of component parts regardless of whether the assembly is oriented in the particular orientation shown in the drawings and described in the specification, upside down from that orientation, or any other rotational variation.

It will be appreciated that the term "present invention" as used herein should not be construed to mean that only a single invention having a single essential element or group of elements is presented. Similarly, it will also be appreciated that the term "present invention" encompasses a number of separate innovations which can each be considered separate inventions. Although the present invention has thus been described in detail with regard to the preferred embodiments and drawings thereof, it should be apparent to those skilled in the art that various adaptations and modifications of the present invention may be accomplished without departing from the spirit and the scope of the invention. Accordingly, it is to be understood that the detailed description and the accompanying drawings as set forth hereinabove are not intended to limit the breadth of the present invention, which should be inferred only from the following claims and their appropriately construed legal equivalents.

We claim:

1. A suspension for a hard disk drive having:
    a microactuator on a first side of a central longitudinal axis of the suspension;
    a pseudo symmetry structure that is not a microactuator disposed on a second and opposite side of the central longitudinal axis and in generally mirror relation to the microactuator;
    wherein the pseudosymmetry structure comprises a spring formed integrally in a stainless steel component of the suspension, and a passive weight affixed to the suspension, the passive weight being located closer to the central longitudinal axis than is the spring; and
    wherein the pseudo symmetry structure has a mass that is within 20% of the mass of the microactuator and a stiffness that is within 40% of the stiffness of the microactuator in order to compensate for the mass and stiffness of the microactuator, thus making the suspension more mechanically symmetric about the longitudinal axis.

2. The suspension of claim 1 wherein the spring has a stiffness that gives the pseudo symmetry structure a stiffness that generally balances a stiffness of the microactuator.

3. The suspension of claim 1 wherein:
    the microactuator comprises a piezoelectric element on the first side of the suspension, the piezoelectric element spanning a gap formed in the suspension;
    and wherein the pseudo symmetry structure further comprises:
        an unremoved area of the suspension on the second side of the suspension that corresponds in location to the gap under the piezoelectric on the first side;
    wherein the unremoved area, the spring, and the weight are adjacent with each other and serve to counterbalance mechanical properties of the piezoelectric element.

4. The suspension of claim 1 wherein the pseudo symmetry structure has a stiffness that is equal to the stiffness of the microactuator to within 20%.

5. The suspension of claim 1 wherein the pseudo symmetry structure has a mass that is equal to the mass of the microactuator to within 5%.

6. The suspension of claim 1 wherein the pseudo symmetry structure has a stiffness that is equal to the stiffness of the microactuator to within 5%.

7. The suspension of claim 1 wherein the weight is affixed to the suspension at a location that is generally laterally opposite the microactuator.

8. The suspension of claim 1 wherein the pseudo symmetry structure has at least one hole formed therein.

9. A suspension for a hard disk drive, the suspension having a microactuator comprising:
    a single non-split piezoelectric element on a first lateral side of a central longitudinal axis of the suspension opposite a second lateral side; and
    a spring integrally formed in the suspension and a passive weight affixed to the suspension adjacent the spring, the passive weight being located closer to the central longitudinal axis than is the spring;
    wherein the spring integrally formed in the suspension and the passive weight affixed to the suspension are disposed on the second lateral side of the central longitudinal axis opposite from the first side, in generally mirror relation to the piezoelectric element;
    wherein the second lateral side of the suspension has no piezoelectric element and is in mass balance and inertial balance with the first lateral side of the suspension to within 10%.

10. The suspension of claim 9 wherein said mass balance is to within 5%.

11. In a suspension for a data storage drive, a method of achieving fine movements of a read-write head, the method comprising:
    moving the read-write head by a microactuator disposed on a first lateral side of a central longitudinal axis of the suspension;
    wherein a pseudo symmetry structure that is not a microactuator and that includes a passive weight affixed to the suspension and a spring, the spring being defined in part by a void defined by an area of removed metal, is disposed on a second lateral side of the suspension opposite the first side, the passive weight being located closer to the central longitudinal axis than is the spring;
    wherein the pseudo symmetry structure has a mass and a stiffness such that the mass and stiffness of the suspension on the first lateral side thereof is generally balanced out by the mass and stiffness on the second lateral side thereof.

* * * * *